Dec. 29, 1936.  T. J. FEGLEY ET AL  2,065,677
MACHINE FOR BREAKING CUBES OF ICE
Filed Nov. 10, 1934  3 Sheets-Sheet 1
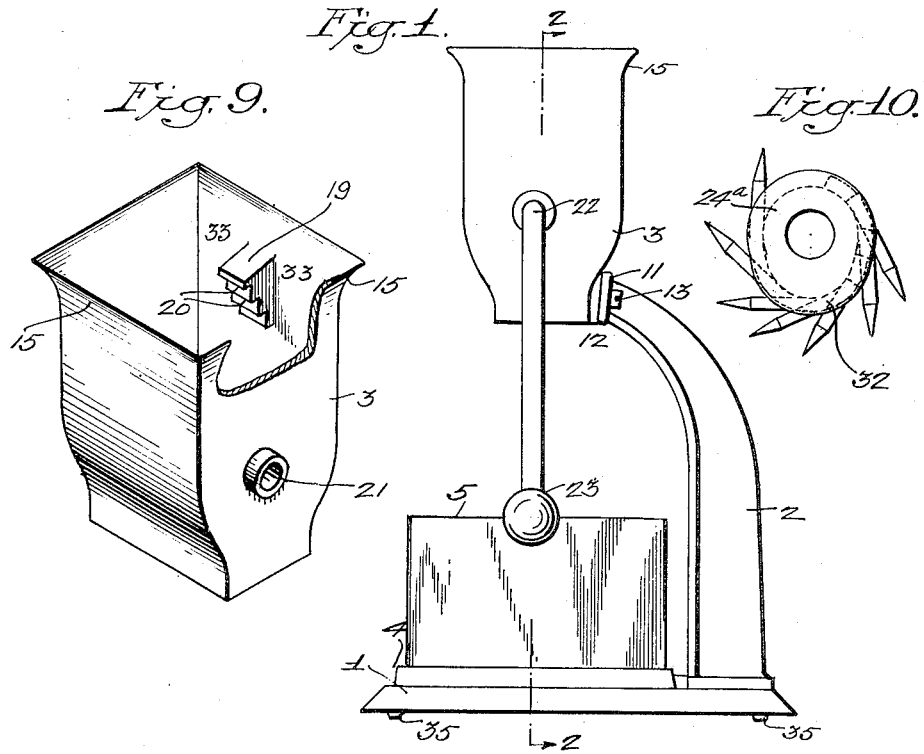
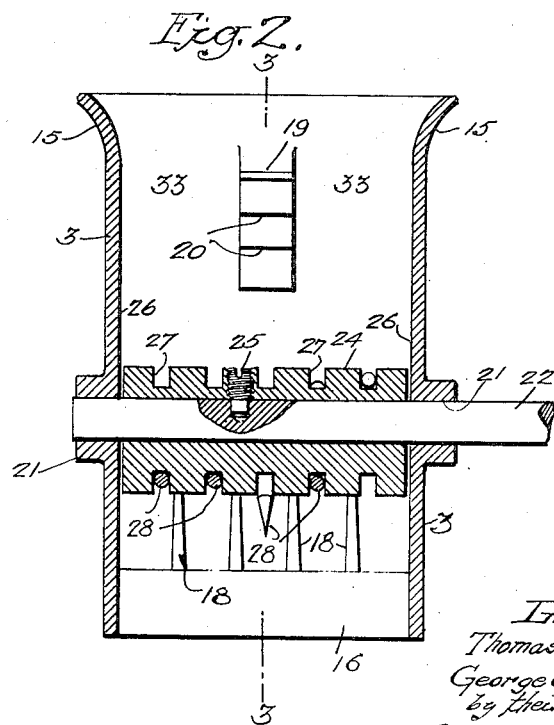
Inventors.
Thomas J. Fegley
George O. Leopold
by their Attorneys

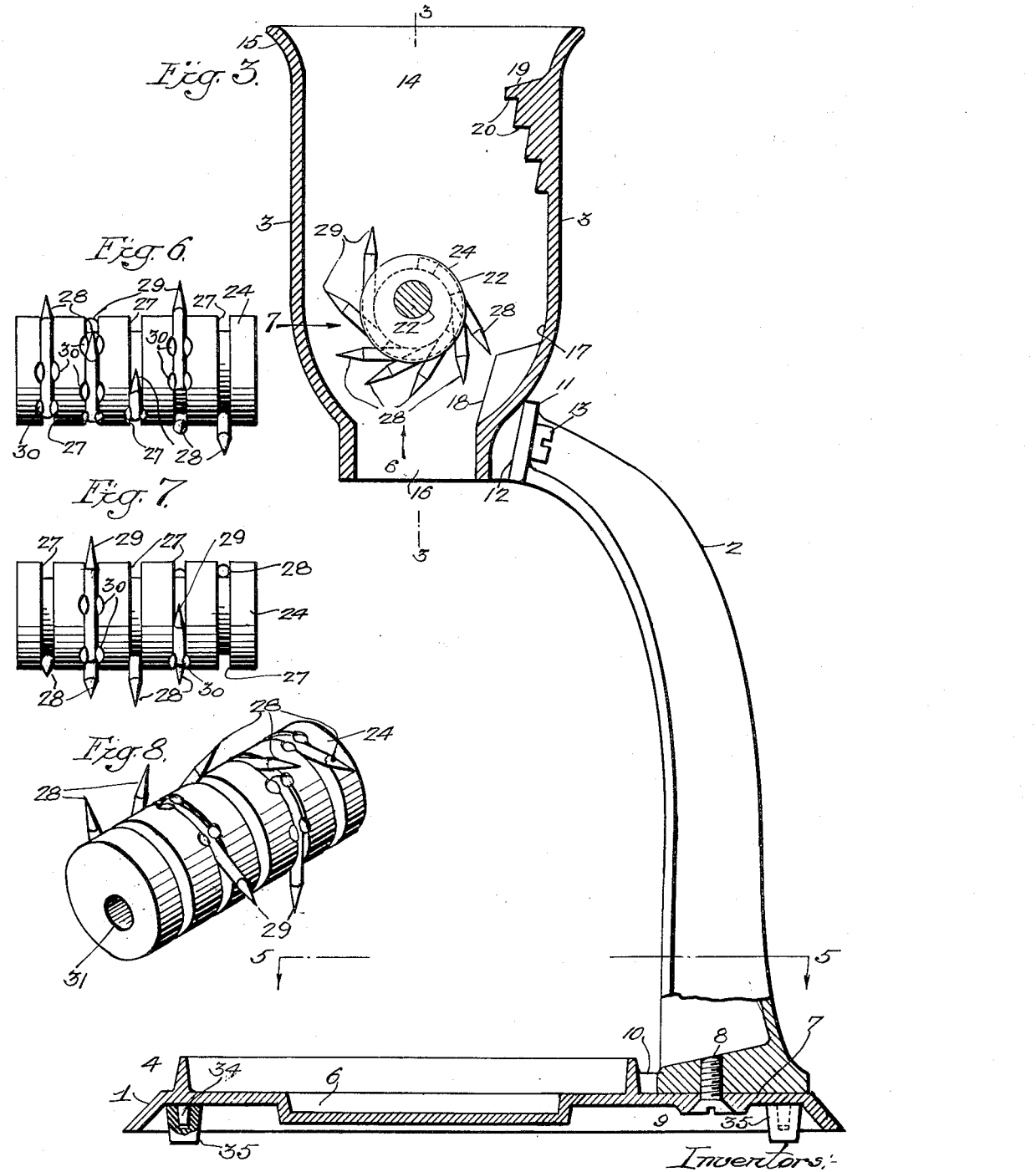

Dec. 29, 1936.  T. J. FEGLEY ET AL  2,065,677
MACHINE FOR BREAKING CUBES OF ICE
Filed Nov. 10, 1934  3 Sheets-Sheet 3
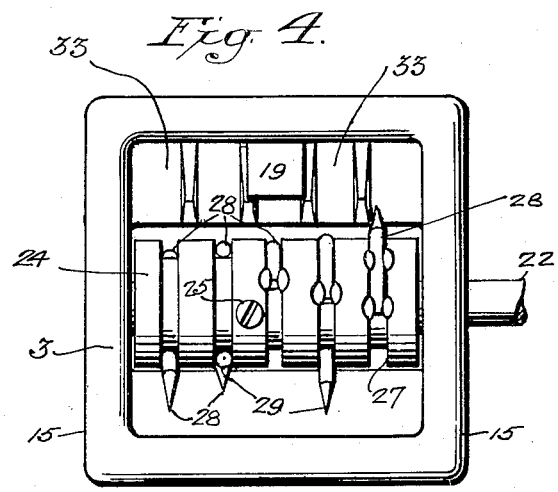
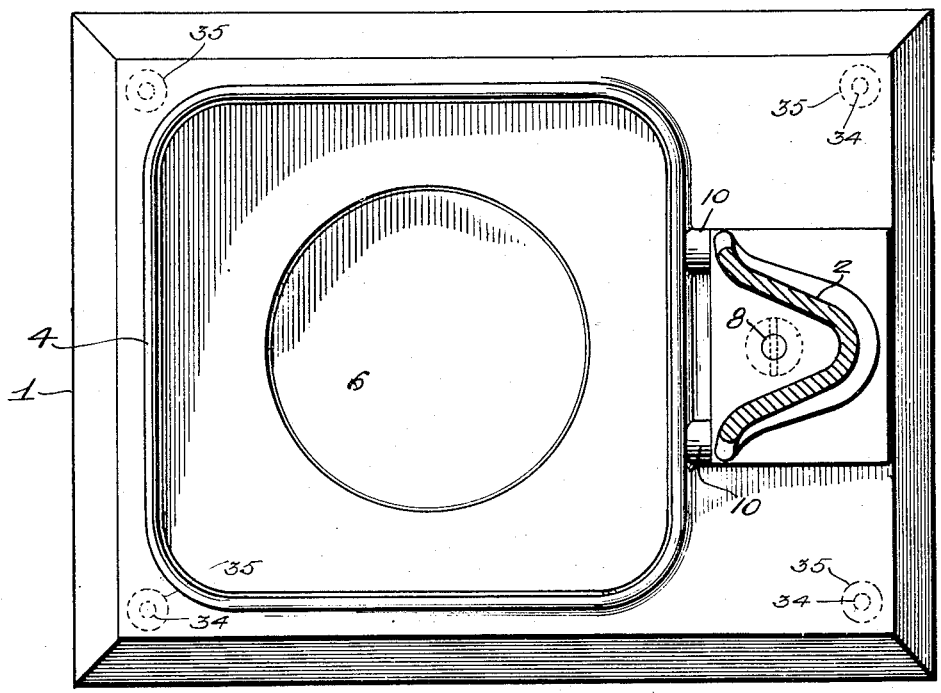
Inventors.
Thomas J. Fegley
George O. Leopold
by their Attorneys Patented Dec. 29, 1936

2,065,677

UNITED STATES PATENT OFFICE 2,065,677

MACHINE FOR BREAKING CUBES OF ICE

Thomas J. Fegley and George O. Leopold, Philadelphia, Pa., assignors to North Bro's M'f'g Co., Philadelphia, Pa., a corporation of Pennsylvania Application November 10, 1934, Serial No. 752,500

1 Claim. (Cl. 83—63)

Our invention relates to certain improvements in machines for breaking cubes of ice which are formed in mechanical refrigerators. The invention is an improvement on the machine for which application for patent was filed on July 29, 1931, Serial No. 553,858 and which became a patent on November 13, 1934, No. 1,980,952. This application is a continuation in part of the application Serial No. 553,858 noted above.

One object of the invention is to reduce the cost of manufacture of the machine by making the casing as a complete die casting.

A further object of the invention is to provide two sets of teeth, one being of greater number than the other set so that the teeth of less number will penetrate the cube and break off comparatively large pieces from the cube, and the teeth of greater number will cut the large pieces into smaller pieces and, as these teeth act in conjunction in the present instance with the eccentric portion of the cylinder, the pieces will be crushed as well as broken, while they are retained by the teeth at the lower portion of the casing which hold the particles until they are of such size as to pass through the spaces between the fixed teeth.

A further object of the invention is to provide a single inclined projection on the inner wall of the hopper and this projection has one or more abutments which engage the ice cube and prevent it raising when the cube is penetrated by the teeth of the breaking mechanism.

A further object of the invention is to provide a base which will accommodate a large receptacle or a tumbler, both the receptacle and the tumbler being held in a position at the bottom in respect to the outlet opening of the machine while the ice is being crushed.

In the accompanying drawings:

Fig. 1 is a side view of our improved machine for breaking cubes of ice;

Fig. 2 is a sectional elevation on the line 2—2 of Fig. 1;

Fig. 3 is a sectional view on the line 3—3 of Fig. 2;

Fig. 4 is a plan view;

Fig. 5 is a sectional plan view on the line 5—5 of Fig. 3;

Fig. 6 is a detached side view of the toothed cylinder looking in the direction of the arrow 6, Fig. 3;

Fig. 7 is a side view of the toothed cylinder looking in the direction of the arrow 7, Fig. 3;

Fig. 8 is a perspective view of the cylinder;

Fig. 9 is a perspective view of the upper end of the hopper broken away to show the projection having a series of abutments; and Fig. 10 is a modification of the eccentric tooth carrying the cylinder.

Referring to the drawings, 1 is the base of the machine, 2 is a standard which supports a casing 3. On the base 1 is a rectangular flange 4 in which a rectangular receptacle of glass or other material is placed to receive the broken particles of ice after they have passed through the machine. This receptacle is readily removable so that when it is filled with ice particles, it can be removed from the machine, emptied and readily replaced. Within the rectangular flange is a depression 6 to receive and hold the lower end of a tumbler in line with the discharge opening in the casing of the machine so that when it is wished to fill a tumbler with ice, it can be readily placed in the depression and held in position.

The standard 2 is secured to the base at one side of the rectangular flange, as shown in Figs. 3 and 5. The standard is made V-shaped in cross section, as shown in Fig. 5, and the web 7 at the lower portion of the standard is perforated and screw threaded for the passage of a screw 8 which extends through an opening in the base. Projecting from the rectangular flange 4 adjacent the standard are two lugs 10 which act to center the standard and hold it from turning on the screw. At the upper end of the base is a flange 11 which fits against a flattened surface 12 on the casing 3 and is held rigidly to the casing by screws 13.

The entire casing 3 is made as a die casting and has vertical sides and ends, the upper portion of the casing forming a hopper 14. At the upper edge of the hopper is an out-turned flange 15 in the present instance and at the lower end is a discharge opening 16.

The casing has a segmental crushing surface 17 and below this crushing surface is a series of ribs 18 which are spaced at such a distance apart as to hold the particles of ice until they have been cut and broken to such size as to pass through the spaces between the ribs.

A projection 19 extends from the inner side wall of the hopper above the crushing surface 17 and has an inclined face in which are a series of abutments 20. The back of each abutment is beveled to allow an edge of an ice cube to more readily enter one of the spaces between the abutments. The abutments tend to hold the cubes of ice against upward movement while they are being penetrated and broken by the teeth of the cylinder described hereinafter. The projection 19 is cast integral with the casing.

Cast integral with the casing 3 are bearings 21 for a shaft 22 having a handle 23 by which it is turned. Mounted on the shaft 22 is an eccentric cylinder 24. This cylinder is secured to the shaft 22 by a set screw 25. The cylinder fits between the end walls 26 of the casing 3 and has a series of annular grooves 27 therein. In the present instance, there are five grooves, and in these grooves are secured the teeth 28 and 29. The shanks of five teeth 28 fit in the grooves 27 and are bent to fit the grooves; the teeth are secured in the grooves by peening over the edges of the walls of the grooves. There are two peened portions 30 in the present instance which rigidly hold the teeth in position.

The teeth in the present instance are cylindrical in cross section and are sharpened, their projecting ends forming spikes which readily penetrate the ice cubes and break pieces therefrom. The teeth project tangentially from the cylinder, as shown in Fig. 3. In the present instance, there are only two teeth 29 which are located and secured in two of the grooves 27 in the same manner as the teeth 28 and they are spaced a greater distance apart than the teeth 28 so that when they penetrate the ice cube, they will break from the cube comparatively large pieces of ice and, when these particles of ice are penetrated by the teeth 28, they are broken in smaller pieces. The cylinder 24 is eccentrically mounted on the shaft 22 so that as the cylinder is rotated by the shaft, it has an eccentric movement to and from the crushing surface 17 of the casing, it being directly opposite the said crushing surface. The cylinder crushes the ice to a certain degree as the teeth 28 pass the crushing surface.

The teeth 28 project tangentially from the cylinder at a greater distance from the center of the shaft opening 31 in the cylinder 24 and the several teeth are offset so that one tooth will cut in advance of the other in order that the teeth of each series will not engage the ice at once, reducing the power necessary to cut the cubes of ice.

While we have shown a true cylinder in Fig. 3, the cylinder 24a may be provided with a lobe 32, Fig. 10, which is in the form of an eccentric which will accomplish the same purpose as the eccentrically-mounted cylinder shown in Fig. 3.

In the present instance, the walls of the casing are vertical and the projection 19 which is integral with the casing and which extends into the hopper has an inclined face provided with one or more abutments with which the ice cubes engage as they are being broken by the teeth of the cylinder, holding them against upward movement. The bearings 21 and the ribs 18 are also cast integral with the casing. This construction allows the casing to be made as a unitary die casting, thus considerably simplifying the manufacture of the machine.

It will be noted in this construction that the projection 19 is comparatively narrow and is located substantially at the centre of the side wall from which it projects, leaving an unobstructed space 33 between the projection and the end walls 26 of the casing, so as to allow the ice cubes to enter the spaces and to more readily engage the abutments of the projection 19.

Ice cubes are substantially rectangular in cross section and are very difficult to feed into a machine unless they are handled with care and in machines of this type it is very dangerous, particularly in household machines, to place the cubes in the machine and hold them by hand. In this machine, however, the ice cubes may be placed in any manner in the machine and as the shaft is turned, the ice cubes will be forced by the teeth of the cylinder against the side wall having the inclined projection so that the cube, no matter how it is situated in the hopper, will engage one of the abutments of the projection and, as the cylinder is rotated, the teeth 29 will break off large particles of ice from the cube, as they are spaced a greater distance apart than the teeth 28. These particles are then engaged by the teeth 28 and are carried into the space between the cylinder and the crushing surface of the casing and are crushed by the cylinder while the teeth 28 feed the particles towards the outlet 16. The particles, however, are held by the ribs 18 on the casing until they are sufficiently crushed and broken to pass through the spaces between the ribs 18, as it will be understood that this machine does not pulverize or grind the ice but breaks the ice into small cubes or particles which are not melted as readily as finely crushed ice.

While the invention is particularly adapted for cutting cubes of ice frozen in an electric or other refrigerator, it can be used for cutting blocks of ice of any form without departing from the essential feature of the invention.

In the present instance, integral pins 34 project from the under side of the base, and on these pins are cushions 35 of rubber or other suitable material which rest on a table or other suitable support.

We claim:

The combination in an ice cube breaker of a casing having a segmental crushing surface; a shaft; bearings in the casing for the shaft; means for turning the shaft; a cylinder located within the casing and eccentrically mounted on the shaft, said cylinder being spaced from the crushing surface of the casing, ribs on the casing below the crushing surface thereof for detaining the particles of ice until sufficiently broken to pass between said ribs; two sets of teeth projecting substantially tangentially from the cylinder, one set of teeth being on one side of the cylinder and the other set of teeth being on the opposite side thereof, one set of teeth being greater in number than the other set and spaced closer together axially of the cylinder than the teeth of the other set, the set of teeth of greater number projecting from the eccentrically mounted cylinder at a greater distance from the center of the shaft opening in the cylinder than the other set of teeth, and the teeth of each set being offset circumferentially of the cylinder so that one tooth will cut in advance of the others.

THOMAS J. FEGLEY.
GEORGE O. LEOPOLD.